(12) United States Patent
Remmert

(10) Patent No.: US 11,277,999 B2
(45) Date of Patent: Mar. 22, 2022

(54) SHED, IN PARTICULAR FOR HOLDING PIGS

(71) Applicant: Ralf Remmert, Neudorf (DE)

(72) Inventor: Ralf Remmert, Neudorf (DE)

(73) Assignee: BIG DUTCHMAN INTERNATIONAL GMBH, Vechta (DE)

(*) Notice: Subject to any disclaimer, the term of this patent is extended or adjusted under 35 U.S.C. 154(b) by 389 days.

(21) Appl. No.: 16/069,028

(22) PCT Filed: Jan. 13, 2017

(86) PCT No.: PCT/EP2017/050694
§ 371 (c)(1),
(2) Date: Jul. 10, 2018

(87) PCT Pub. No.: WO2017/121864
PCT Pub. Date: Jul. 20, 2017

(65) Prior Publication Data
US 2019/0021274 A1 Jan. 24, 2019

(30) Foreign Application Priority Data

Jan. 13, 2016 (DE) .......................... 102016000308.1

(51) Int. Cl.
*A01K 1/01* (2006.01)
*A01K 1/02* (2006.01)

(52) U.S. Cl.
CPC .......... *A01K 1/0135* (2013.01); *A01K 1/0103* (2013.01); *A01K 1/02* (2013.01);
(Continued)

(58) Field of Classification Search
CPC ...... A01K 1/01; A01K 1/0103; A01K 1/0135; A01K 1/0139; A01K 1/0142
See application file for complete search history.

(56) References Cited

U.S. PATENT DOCUMENTS

| | | | | | |
|---|---|---|---|---|---|
| 1,090,131 | A | * | 3/1914 | Bowditch | ............ A01K 1/0135 119/451 |
| 1,159,129 | A | * | 11/1915 | Tellefson | ............ A01K 1/0103 198/499 |

(Continued)

FOREIGN PATENT DOCUMENTS

| | | |
|---|---|---|
| CN | 1288964 | 12/2006 |
| CN | 101164410 | 4/2008 |

(Continued)

*Primary Examiner* — Michael H Wang
(74) *Attorney, Agent, or Firm* — Price Heneveld LLP

(57) ABSTRACT

The invention relates to a shed with a defecation region, a rest region, a feeding region and an activity region. The floor of the defecation region is formed by the upper run of a conveyor belt, through which urine that is produced can pass. A collecting trough for the urine is arranged under the upper run of the conveyor belt, from which collecting trough the urine is guided away and directed into a urine collection container outside the shed. An excrement scraper is disposed proximate the conveyor belt in the region of the rear deflection thereof. The excrement scraper, during the forward movement of the conveyor belt, scrapes the excrement on the conveyor belt off onto a discharge conveyor belt, in such a way that a separation of excrement and urine takes place.

15 Claims, 4 Drawing Sheets

(52) U.S. Cl.
CPC .......... *A01K 1/0209* (2013.01); *A01K 1/0227* (2013.01); *A01K 2227/108* (2013.01)

(56) References Cited

U.S. PATENT DOCUMENTS

| | | | |
|---|---|---|---|
| 1,610,220 A | | 12/1926 | Olson |
| 1,623,171 A | | 4/1927 | Doser |
| 1,973,530 A | | 9/1934 | Hart |
| 2,021,746 A | | 11/1935 | Purnell |
| 2,280,511 A | | 2/1942 | Forsyth |
| 2,579,355 A | * | 12/1951 | Ahrens .................. A01K 31/12 119/531 |
| 2,591,643 A | * | 4/1952 | Volmer ................ A01K 1/0128 119/451 |
| 2,595,392 A | * | 5/1952 | Lalancette ............. A01K 31/04 119/442 |
| 2,728,324 A | | 12/1955 | Radocy |
| 3,274,973 A | * | 9/1966 | Woods .................. A01K 1/0135 119/51.11 |
| 3,385,266 A | | 5/1968 | Launder et al. |
| 3,465,722 A | | 9/1969 | Duff |
| 3,478,721 A | | 11/1969 | Maxfield |
| 3,611,472 A | * | 10/1971 | Layser ................... A01K 1/015 15/302 |
| 3,620,193 A | * | 11/1971 | Frers ...................... A01K 39/01 119/456 |
| 3,635,197 A | | 1/1972 | Van Huis |
| 3,777,710 A | | 12/1973 | Rhinehart |
| 3,793,988 A | * | 2/1974 | Traeger ................ A01K 1/0117 119/164 |
| 3,903,851 A | | 9/1975 | Van Huis |
| 3,994,260 A | | 11/1976 | Fleshman |
| 4,020,793 A | * | 5/1977 | Morrison ............. A01K 31/002 119/479 |
| 4,050,163 A | | 9/1977 | Short |
| 4,315,481 A | | 2/1982 | Coile et al. |
| 4,561,419 A | | 12/1985 | Koziol |
| 4,697,547 A | | 10/1987 | Malestein |
| 4,869,206 A | | 9/1989 | Spina |
| 5,094,186 A | | 3/1992 | Andersen |
| 5,174,242 A | * | 12/1992 | Takeuchi ............. A01K 31/005 119/439 |
| 5,596,818 A | | 1/1997 | Jones |
| 5,666,905 A | | 9/1997 | Mackin et al. |
| 5,737,850 A | | 4/1998 | Hendrix |
| 5,817,241 A | * | 10/1998 | Brayboy ................ B01D 29/94 210/800 |
| 6,340,000 B1 | * | 1/2002 | Holtrop .................. A01K 31/04 119/442 |
| 6,467,432 B1 | | 10/2002 | Lewis et al. |
| 7,401,575 B2 | * | 7/2008 | Waybright ........... A01K 1/0132 119/451 |
| 7,614,365 B2 | * | 11/2009 | Kuhlmann ........... A01K 1/0103 119/451 |
| 8,182,593 B2 | | 5/2012 | Rapp |
| 8,514,045 B2 | | 8/2013 | Sankar |
| D691,418 S | | 10/2013 | Minton et al. |
| 8,910,594 B2 | | 12/2014 | Kuking |
| 9,441,884 B2 | | 9/2016 | McCallum et al. |
| 2002/0100427 A1 | | 8/2002 | Notenbomer |
| 2003/0205205 A1 | | 11/2003 | Opfel |
| 2004/0040517 A1 | * | 3/2004 | Lindvall ............... A01K 1/0135 119/502 |
| 2004/0088878 A1 | | 5/2004 | Langley et al. |
| 2005/0028748 A1 | * | 2/2005 | Kuhlmann ........... A01K 1/0135 119/451 |
| 2007/0277745 A1 | | 12/2007 | Clemmons et al. |
| 2011/0061601 A1 | | 3/2011 | Correa et al. |
| 2012/0055414 A1 | | 3/2012 | Correa |
| 2014/0208607 A1 | | 7/2014 | Navazo et al. |

FOREIGN PATENT DOCUMENTS

| | | |
|---|---|---|
| CN | 101277747 | 10/2008 |
| CN | 201365442 | 12/2009 |
| CN | 201657679 | 12/2010 |
| CN | 103891622 | 7/2014 |
| DE | 697 20 794 | 1/2004 |
| DE | 602 12 602 | 5/2007 |
| DE | 10 201 101 089 | 11/2012 |
| DE | 10 2011 101 089 | 11/2012 |
| DE | 102011101089 | 11/2012 |
| DE | 10 2016 000 308 | 3/2017 |
| DE | 10 2016 013 326 | 5/2018 |
| DO | 137 524 | 9/1979 |
| EP | 0498084 | 8/1992 |
| EP | 1149528 | 10/2001 |
| EP | 1308088 | 5/2003 |
| EP | 1678059 | 7/2006 |
| GB | 2249263 | 5/1992 |
| WO | 0243472 | 6/2002 |
| WO | 2005037690 | 4/2005 |
| WO | 2007016758 | 2/2007 |
| WO | 2013048333 | 4/2013 |

* cited by examiner

SHED, IN PARTICULAR FOR HOLDING PIGS

CROSS-REFERENCE TO FOREIGN PRIORITY APPLICATION

The present application claims the benefit under 35 U.S.C. § 119(b), 119(e), 120, 121, 365(c), and/or 386(c) of PCT/EP2017/050694 filed Jan. 13, 2017, which claims priority to German Application No. 102016000308.1 filed Jan. 13, 2016.

FIELD OF THE INVENTION

The invention relates to a shed, in particular a pig shed, with a defecation region, and also with a rest region, a feeding region, and an activity region.

BACKGROUND OF THE INVENTION

It is already known from DE 10 2011 101 089 to design a pig shed in such a way that the animals are provided with a stationing region, a lying region, which is covered with litter material, a defecation region and a feeding region. A set-up of this kind already offers a species-appropriate environment, especially as it avoids using a slatted floor, which damages the hooves of the animals. The concrete floor of the lying region in this case slopes toward the defecation region, with the result that litter material is moved, by the kicking and rooting movements of the pigs, in the direction of the defecation region. There, the straw mixes with the excrement from the pigs to form a mixture referred to as dung. This dung is regularly removed by means of a slide mounted on a tractor and then taken to a storage area. Since the dung is produced in considerable quantities, its disposal creates problems. In addition, urine and excrement are not separated and, as in all conventional shed arrangements, ammonia develops in considerable concentration in the shed, which may be injurious to the health of the animals and of the people working there.

The patent specification DD 137 524 also already describes an arrangement by which the urine and excrement discharged by a mechanical cleaner are separated into a liquid phase and solids on a plane underneath the slatted floor of a shed and are discharged from the shed. However, the use of a slatted floor is known to run counter to species-appropriate animal husbandry, since it is known that the hooves of the animals may become damaged.

The Swedish company Moving Floor Gotland AB, Visby, has also already presented on YouTube, on the internet, a shed installation under the designation "moving floor svin", in which the floor of the shed is formed by a conveyor belt. A subdivision of the shed into different stationing regions, which is advantageous for species-appropriate animal husbandry, is not provided. The animals stay exclusively on the conveyor belt which forms the shed floor and on which litter material becomes mixed with urine and excrement.

Moreover, a separation of urine and excrement does not take place here. The animals are not given the opportunity to run about and look for a comfortable place to rest. The conveyor belt with the animals located on it is also moved forward by a short distance at regular intervals in order to remove the deposits. This leads to constant disadvantageous disturbance of the animals, who have no chance to get out of the way. Antisocial behavior and aggressiveness of the animals are intensified.

SUMMARY OF THE INVENTION

The object of the invention is to enable species-appropriate animal husbandry in such a way that, by avoidance of a slatted floor, the animals are provided with a pleasant environment. In particular, the development of harmful emissions in the shed is to be avoided, particularly of ammonia, by means of an efficient separation of excrement and urine. In addition, the separation of excrement and urine is intended to avoid the disadvantages of liquid manure.

According to the invention, this object is achieved by the fact that the floor of the defecation region is formed by the upper run of a conveyor belt through which the urine that is produced can pass, that a collecting trough for the urine is arranged underneath the upper run of the conveyor belt, from which collecting trough the urine is guided away, and that an excrement scraper is assigned to the conveyor belt in the region of the rear deflection of the latter, particularly at the location on the conveyor belt where, during a forward movement of the conveyor belt, excrement located on the conveyor belt is scraped off onto a discharge conveyor belt in such a way that a separation of excrement and urine takes place.

The conveyor belt of the shed according to the invention can be a continuous conveyor belt, which runs around front and rear deflection rollers. This conveyor belt can be provided with apertures incorporated into the material of the conveyor belt. The surface of the conveyor belt can be formed, for example, from a continuous elastomer. The conveyor belt can be, for example, an elastomer reinforced with fibers or wires. The apertures can be punched in or drilled in.

The conveyor belt is preferably designed as a modular belt and has a plurality of modules connected to one another by hinges. The articulated connection of the modules is effected in a hinge region.

It has been shown that the urine produced in the defecation region can preferably advantageously flow off from the modular belt across the hinge regions thereof without pooling in such a way that it contains only very small fractions of solid organic material. Thus, the individual modules can have a closed, plane surface. The described effect is achievable by using, for example, a Siegling Prolink modular belt of the type designated S1-0 FLT. A closed, plane surface is found comfortable by the animals. The achievable, permanently good permeability of the hinge regions with respect to urine is explained by the fact that a relative movement takes place particularly in the deflection regions of a modular belt in the region of the gaps of the hinge regions of the modules, which relative movement results in a constant self-cleaning effect which is such that solid constituents cannot settle. The gaps of the hinge regions remain open for the urine to flow off. This is assisted by the spatial separation of the rest region, the feeding region and the activity region with the litter materials, for example straw and structured feed, from the defecation region. Moreover, the separation of the animals from their excrement has considerable advantages as regards hygiene. The well-being of the animals and of the personnel is greatly enhanced.

Modules with outflow openings could also be used. However, the described self-cleaning effect is not then obtained in the region of these outflow openings. In addition, as long as the outflow openings have not clogged up, the modules would be open to an undesired greater fraction of solids in the outflowing urine.

In a further embodiment of the invention, provision is made that the collecting trough for the urine has an incline, in that the urine is directed, via a urine collection channel, into a urine collection container preferably arranged outside the shed, and in that the discharge conveyor belt extends transversely with respect to the conveyor belt and the excrement is conveyed into an excrement collection container likewise preferably arranged outside the shed.

Preferably, provision is moreover made that the shed has a plurality of adjoining shed units consisting of the defecation region, the rest region, the feeding region and the activity region. It is moreover advantageous if the defecation regions of neighboring shed units adjoin each other, such that the animals of neighboring families of pigs have visual contact with one another, i.e., a grating, for example, permits visual contact. In addition to following their natural cleaning instinct, the animals are thereby encouraged to seek out the defecation region. It has been shown that animals of neighboring families of pigs have a need to interact with one another, i.e., to communicate with one another, upon visual contact, which is conducive to the social behavior of the animals.

Preferably, the conveyor belt is driven intermittently by means of a drive system. The drive system advantageously has a working cylinder which is operated with compressed air and whose piston rod acts on a lever arm which, by way of a freewheel, intermittently drives toothed drive wheels of the conveyor belt. A compressed air drive reduces the electrical components of the belt drive, which lessens the danger of an electrical short-circuit in the installation and, consequently, the danger of fire in the shed. Provision is preferably made that the drive system of the conveyor belt is load-dependent or controlled via sensors in such a way that it is stopped as soon as one or more pigs are located on it. Disturbance of the animals caused by a forward movement of the conveyor belt is thereby avoided.

If appropriate, however, the drive system can also be made load-dependent in such a way that the drive of the conveyor belt proceeds continuously as long as piglets are located on the conveyor belt, i.e., in the defecation region, but such that the drive system is stopped as soon as an adolescent or adult pig whose weight exceeds a fixed value steps onto the conveyor belt. It has been shown that piglets, with their highly developed play instinct, do not react negatively to forward movements of the conveyor belt in the defecation region.

The deflections of the conveyor belt are preferably covered by side walls of the defecation region, in such a way that the animals cannot step onto these regions of the conveyor belt. For acceptance by the pigs, it has been shown that it is also advantageous if the conveyor belt in the defecation region is kept moist by means of a water sprinkler or with an atomizer. The same applies to the arrangement of the drinking device on one side of the defecation region. In principle, it is important that the shed units, using minimal amounts of litter material, or also optionally without litter material, make the purpose of the individual regions clear to the animals by way of their features. The rest region has to offer a high degree of lying comfort and must not be adversely affected by disturbances and the activities of the other occupants of the pen. In addition to the high-performance feed, which is offered exclusively in the feeding region, the activity region offers a structured feed consisting of stimulating foodstuffs that pigs enjoy investigating, chewing, and eating. The defecation region must be formed at the boundary of the shed units and preferably has a grating for visual contact with the neighboring pen.

BRIEF DESCRIPTION OF THE DRAWINGS

An illustrative embodiment of the invention is shown in the drawing and is described in more detail below. In the drawing:

FIG. 5 shows the lever arm of the drive system with freewheel.

DETAILED DESCRIPTION OF THE EMBODIMENTS

Figure 1:
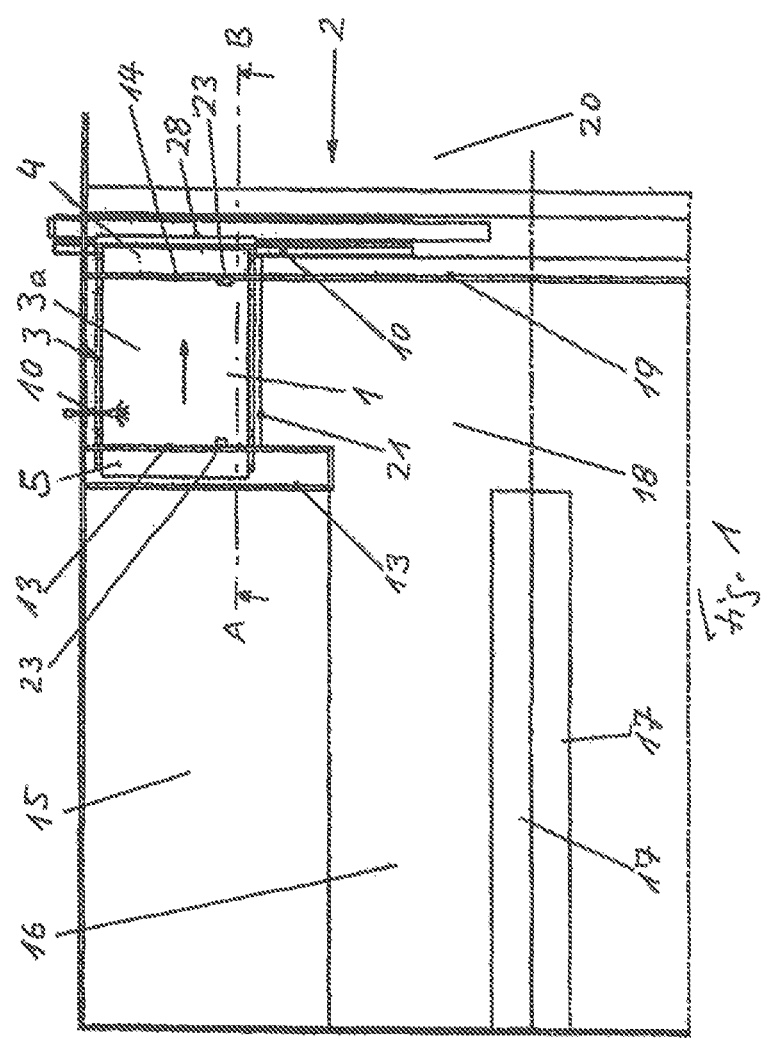
FIG. 1 shows a plan view of a shed unit of a shed.

In the Figures, the same or corresponding elements or units are each provided with the same and/or the corresponding reference signs. When an element or a unit has already been described with reference to a particular Figure, a detailed description is dispensed with when discussing another Figure. However, it is to be understood that the present disclosure may assume various alternative orientations and step sequences, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise. The drawings referenced herein are schematic and associated views thereof are not necessarily drawn to scale.

In the drawing, reference sign 1 designates a defecation region of a shed unit 2, in particular for pigs, in which a conveyor belt 3 is arranged which is configured as a modular belt and whose upper run 3a forms the floor of the defecation region. The conveyor belt 3 has a rear deflection 4 and a front deflection 5. As will be seen from FIG. 2, toothed wheels 6 and 7, each on an axle 8 and 9, are arranged in the region of the deflections 4 and 5 for the purpose of driving and guiding the conveyor belt 3.

In the defecation region 1, a collecting trough 10 for the urine passing from the animals through the modular belt is arranged under the upper run 3a of the conveyor belt 3. The collecting trough 10 has an incline, such that the urine is guided to an outflow 11. In the region of the defecation region 1, a water sprinkler 12 is also arranged, by means of which the conveyor belt 3 can advantageously be kept moist.

Figure 2:
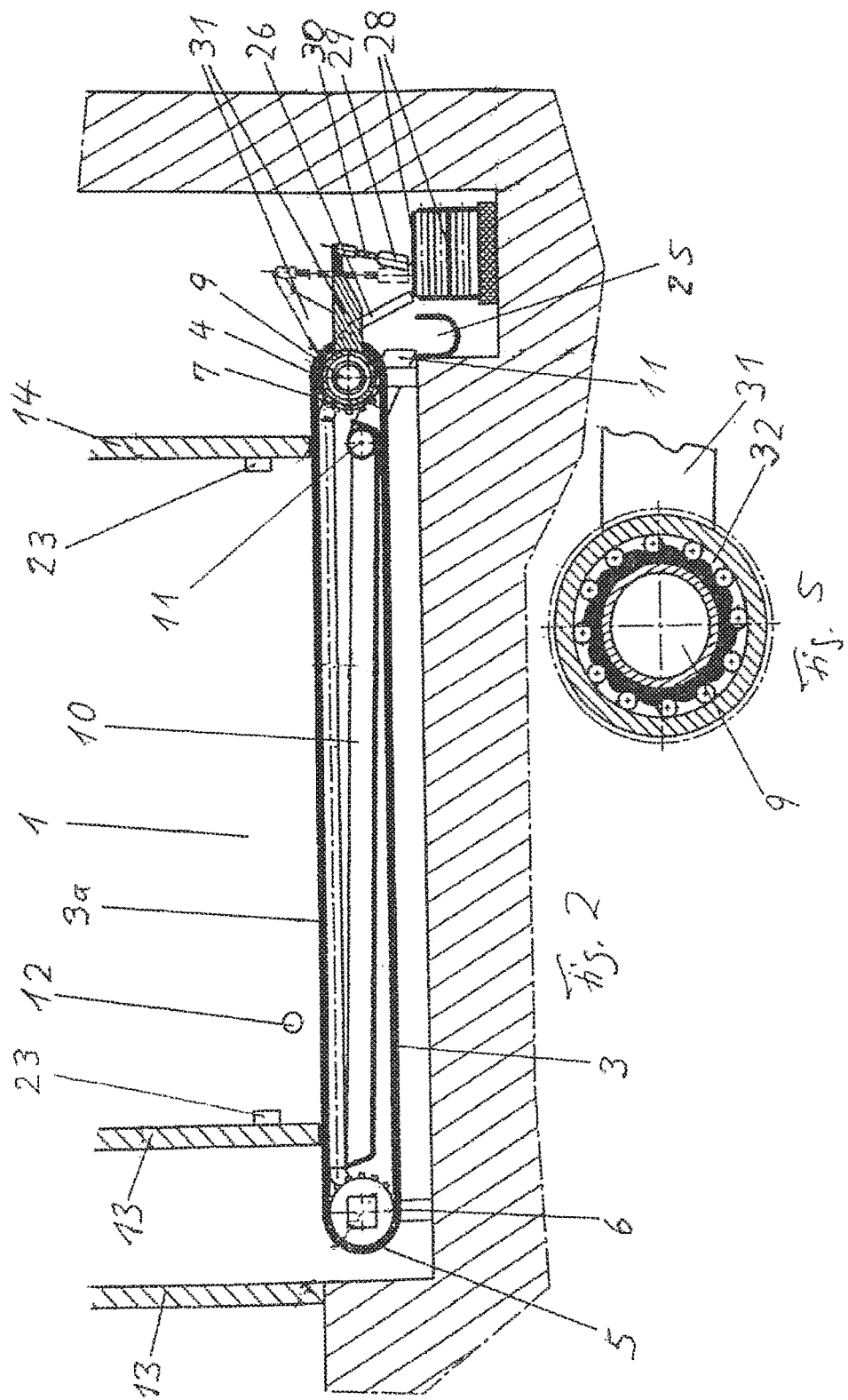
FIG. 2 shows a section A-B through the shed unit according to FIG. 1.

It will also be seen from FIGS. 1 and 2 of the drawings that, in the region of the deflections 4 and 5 of the conveyor belt 3, side walls 13 and 14 are arranged that prevent the animals from being able to step onto this region of the conveyor belt 3. The side wall 13 additionally delimits the defecation region 1 from an adjacent rest region 15 of the shed unit. This rest region 15 is intended to provide a high degree of comfort for the animal lying down and must also not be adversely affected by activities of the other occupants of the shed. The floor of the rest region 15 is, therefore, preferably made of a rubber finish that the animals find comfortable or has a rubber covering.

The rest region 15 is adjacent to a feeding region 16 with a feed trough 17 for the high-performance feed. The feeding region 16 is adjoined by an activity region 18, in which the animals are offered a structured feed containing stimulating foodstuffs that pigs enjoy investigating, chewing, and eating. From the activity region 18, an outer region 20 can also be reached through a passage 19. From the direction of the activity region 18, the animals wishing to defecate are able to step onto the conveyor belt 3 of the defecation region 1 via the open side 21 thereof.

On its upper run 3*a*, the conveyor belt 3 configured as a modular belt conveys the excrement which is deposited on it, and from which the urine has largely dripped off, intermittently into an excrement collection region. According to the illustrated embodiment, sensors 23 arranged on the side walls 13 and 14 prevent running of the conveyor belt 3, or stop the drive system 24 thereof, if there is an animal located on it. Alternatively, the drive system 24 can also be configured such that the advance of the conveyor belt 3 is load-dependent.

On account of the incline, the urine that has dripped into the collecting trough 10 flows laterally out of the region of the conveyor belt, through the outflow 11 into a urine collection channel 25 routed through the shed, and then into a urine collection container (not shown in the drawings) arranged outside the shed.

In the region of the rear deflection 4, an excrement scraper 26 bears on the conveyor belt 3 and, during the forward movement of the latter, the deposited excrement from which the urine has largely dripped off onto a discharge conveyor belt 28 extending transversely with respect to the conveyor belt 3. This discharge conveyor belt 28 conveys the excrement into an excrement collection container (not shown in the drawings) arranged outside the shed for further use. As will be seen from FIGS. 2 and 3, the drive system 24 of the conveyor belt 3 can have a compressed air cylinder 29 with a piston (not shown in the drawings) whose piston rod 30 is guided on a lever arm 31. For the forward movement of the conveyor belt 3, the compressed air cylinder 29 is acted upon in such a way that the lever arm 31 engaging on the drive-side axle 9 is moved upward. The axle 9 entrains the toothed wheel 7, engaging on the conveyor belt 3, and intermittently advances it. Since the lever arm 31, as can be seen from FIG. 5, is operatively connected to the toothed wheel 7 via a freewheel 32, a subsequent downward movement of the lever arm does not drive the toothed wheel 7, i.e., the conveyor belt 3.

Figure 4:
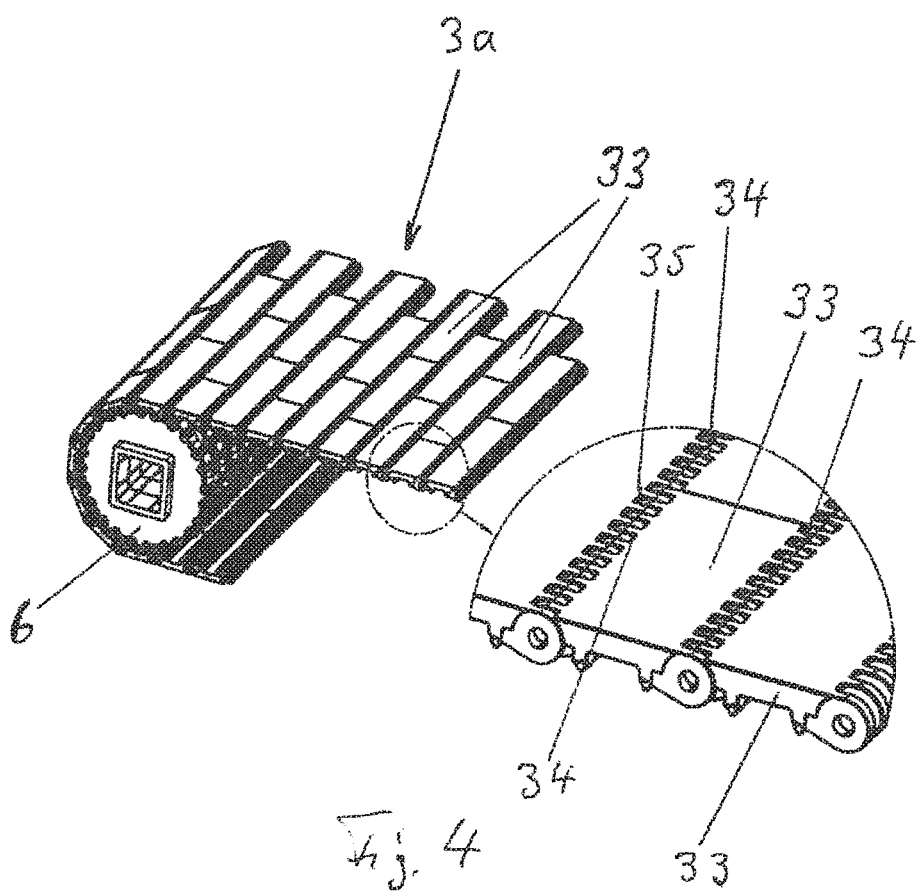
FIG. 4 shows an enlarged view of a conveyor belt configured as a modular belt.

From FIG. 4, which shows a portion of the conveyor belt 3 configured as a modular belt, it will be seen that a multiplicity of gaps 34 are formed in the region of hinge regions 35 between the modules 33 of the conveyor belt having a closed surface, and, according to the invention, the urine from the upper run 3*a* of the conveyor belt 3 flows off through these gaps 34. Here, use is made of a self-cleaning effect of the gaps 34, which results from the deflection movements of the conveyor belt 3.

Figure 3:
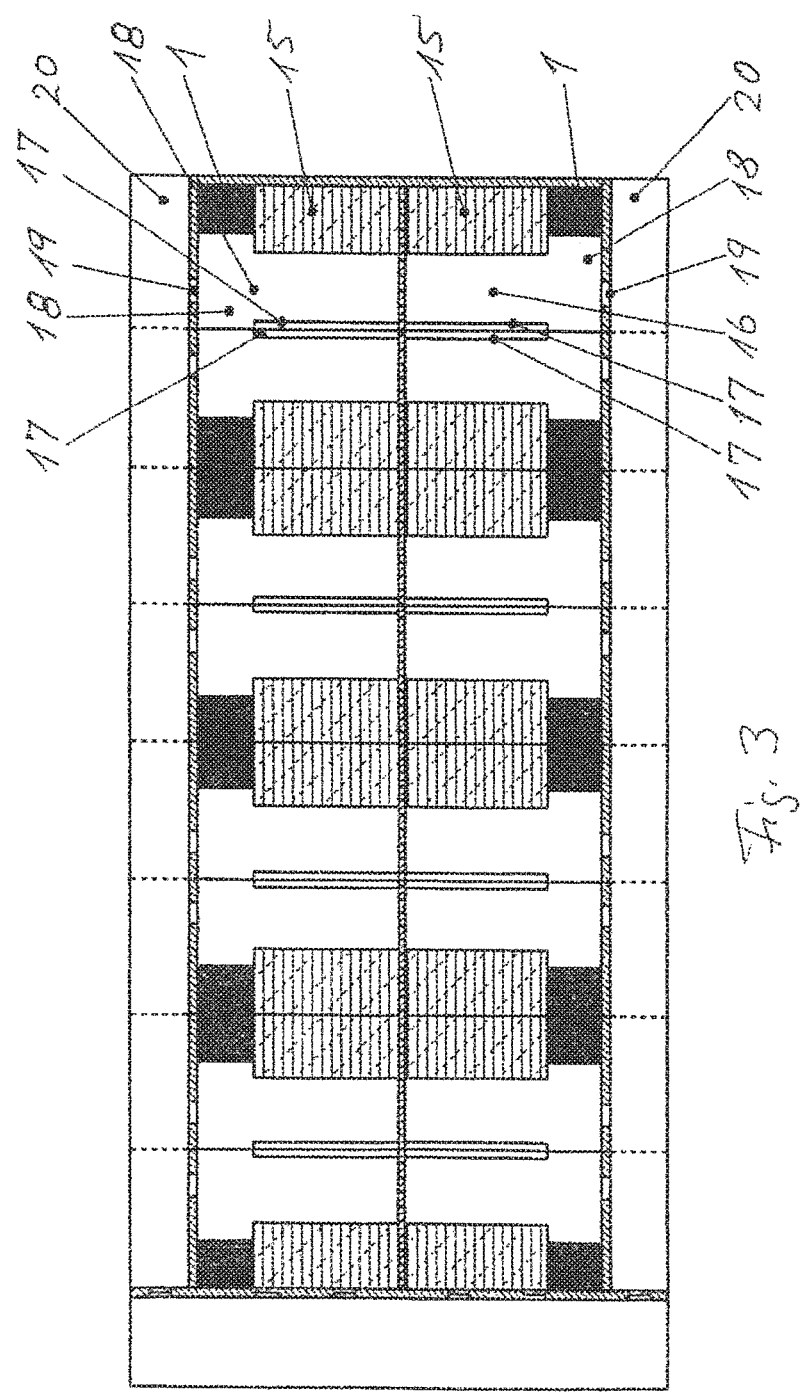
FIG. 3 shows a plan view of a shed with a plurality of shed units.

As will be seen from FIG. 3, a plurality of shed units 2 according to the invention, consisting of the defecation region 1, the rest region 15, the feeding region 16, and the activity region 18, are generally combined to form one unit in a shed. The partition walls between the shed units 2 are then preferably of such a height that visual contact between neighboring families of pigs is still possible, but pigs cannot climb over the partition walls. Animals from neighboring families of pigs can thus interact with one another, i.e., communicate with one another, with visual contact, which favors social behavior.

Here, the urine collection channel 25 advantageously runs all the way through the respective shed. Similarly, the discharge conveyor belt 28 for excrement runs all the way through the shed. Excrement and urine are thus delivered for use outside the shed units 2. The immediate separation of excrement and urine means that ammonia does not develop in the shed. It no longer smells, and expensive waste-air filters are, therefore, not required. The separation of excrement and urine also means that the solid fraction can be used as basic fertilizer in agriculture, and that the urine, substantially freed of solids, is suitable for cultivation control. Use of liquid manure, with its known disadvantages, is avoided.

The invention claimed is:

1. An animal shed having a defecation region comprising:
   a floor formed by an upper run of a conveyor belt through which urine that is produced by the animal may pass, but through which excrement that is produced by the animal may not pass;
   a collecting trough for the urine disposed under the upper run and above a lower run of the conveyor belt from which the urine is guided away from the defecation region; and
   an excrement scraper disposed proximate the conveyor belt in the region of a rear deflection thereof, wherein during forward movement of the conveyor belt, the excrement scraper scrapes off the excrement on the upper run of the conveyor belt onto an excrement discharge conveyor, whereby separation of excrement and urine takes place;
   wherein the collecting trough has a continuous decline toward the rear deflection and toward a urine collection channel having a longitudinal axis, the longitudinal axis of the urine collection channel being disposed proximate and parallel to a longitudinal axis of the excrement discharge conveyor.

2. The animal shed pursuant to claim 1, wherein the conveyor belt comprises a modular belt composed of a plurality of articulated modules between which gaps are provided through which the urine that is produced by the animal may pass.

3. The animal shed pursuant to claim 2, wherein the modules of the conveyor belt have a closed, plane surface.

4. The animal shed pursuant to claim 1, wherein the urine is directed via the urine collection channel into a urine collection container arranged outside the animal shed, and the urine collection channel and the excrement discharge conveyor extends transversely with respect to the conveyor belt and the excrement discharge conveyor conveys the excrement into an excrement collection container likewise arranged outside the animal shed.

5. The animal shed pursuant to claim 1, further comprising a rest region, a feeding region, and an activity region.

6. The animal shed pursuant to claim 5, further comprising a plurality of adjoining shed units each consisting of the defecation region, the rest region, the feeding region, and the activity region, wherein the animals have visual contact with one another in the defecation regions.

7. The animal shed pursuant to claim 6, wherein the urine collection channel guides the urine away from the defecation regions of contiguous shed units of the animal shed and a-the excrement discharge conveyor adapted to guide away the excrement.

8. The animal shed pursuant to claim 1, wherein the conveyor belt is driven intermittently by a drive system.

9. The animal shed pursuant to claim 8, wherein the drive system comprises a pneumatic cylinder whose piston rod acts on a lever arm which, by way of a freewheel, intermittently drives toothed wheels of the conveyor belt.

10. The animal shed pursuant to claim 8, wherein the drive system of the conveyor belt is load-dependent, whereby the conveyor belt is stopped as soon as one or more pigs are located on it.

11. The animal shed pursuant to claim 10, wherein the drive system of the conveyor belt is controlled via sensors, whereby the conveyor belt is stopped as soon as one or more pigs are located on it.

12. The animal shed pursuant to claim 8, wherein the drive system has a load-dependent configuration, whereby the drive of the conveyor belt proceeds continuously as long as piglets are located on the conveyor belt and the drive system is stopped when an adolescent or adult pig whose weight exceeds a fixed value steps onto the conveyor belt.

13. The animal shed pursuant to claim 1, wherein a rear deflection and a front deflection of the conveyor belt are disposed proximate side walls to define the defecation region, whereby animal access to the rear deflection and the front deflection of the conveyor belt is prevented.

14. The animal shed pursuant to claim 1, wherein the urine collection channel comprises an open trough.

15. The animal shed pursuant to claim 1, wherein the excrement conveyor comprises a continuous conveyor belt.

\* \* \* \* \*